March 7, 1961 S. A. OAKLEY 2,973,572
APPARATUS FOR MANUFACTURING SHEATHED
ELECTRICAL HEATING ELEMENTS
Filed April 25, 1956 8 Sheets-Sheet 4

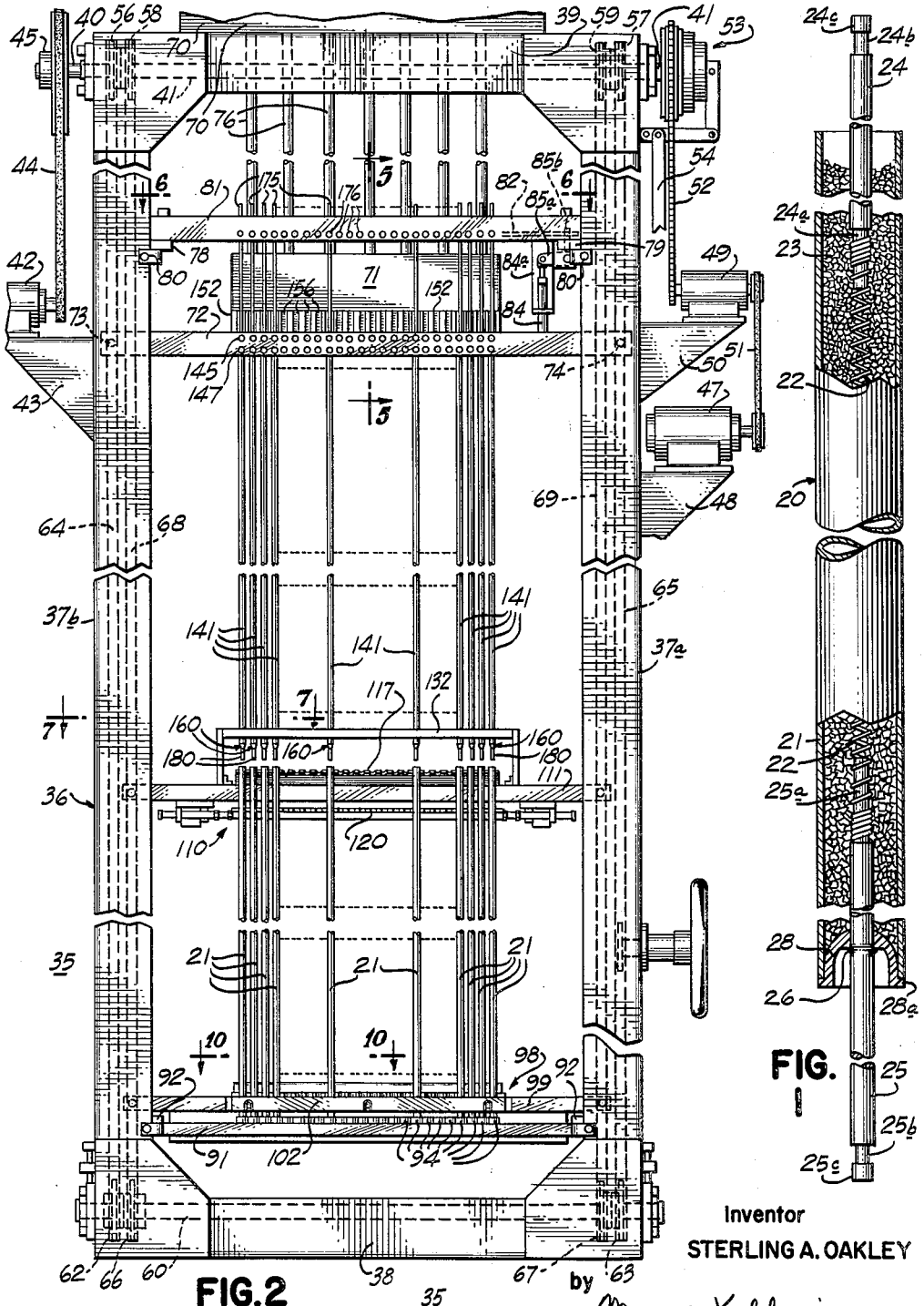

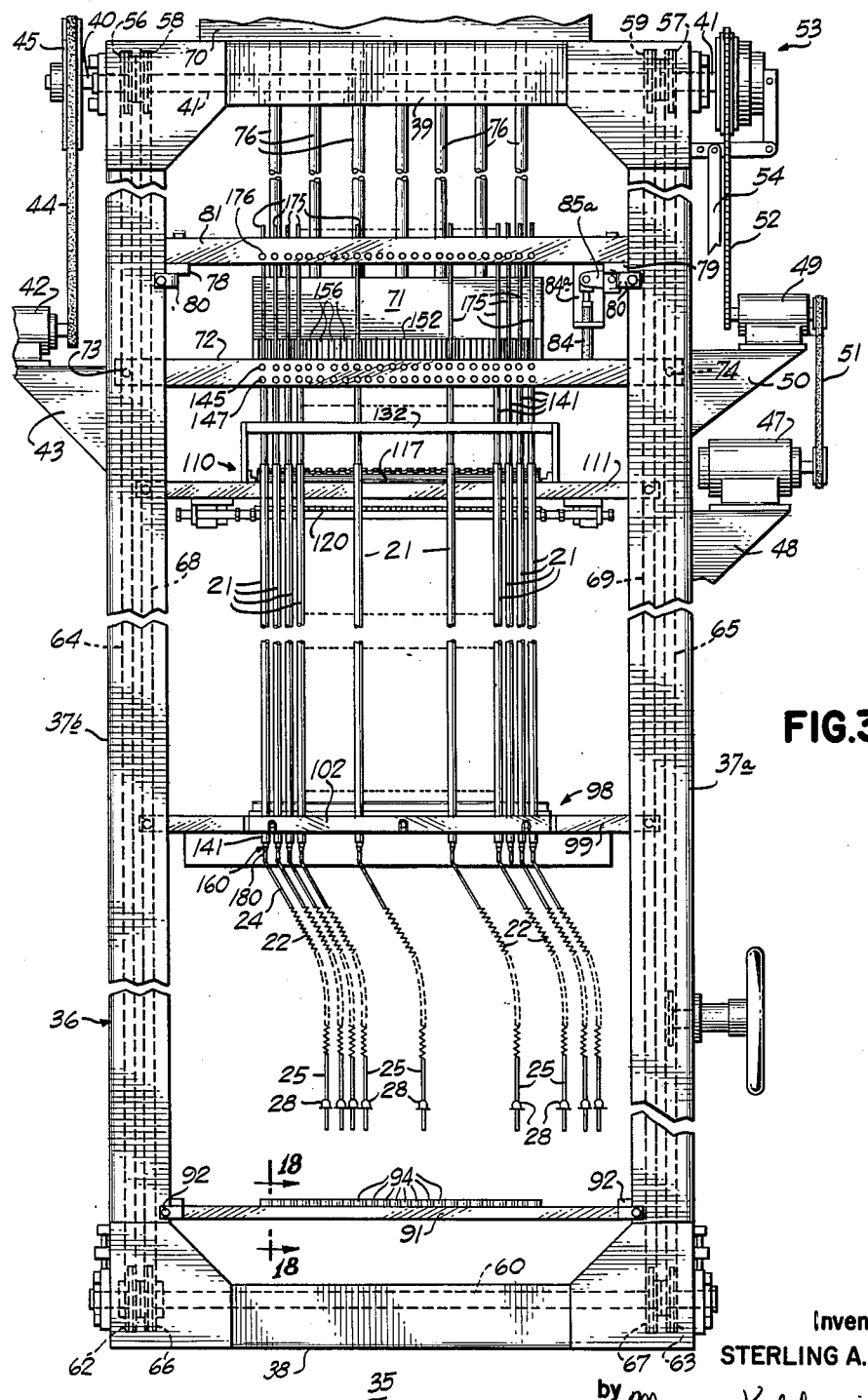

Inventor
STERLING A. OAKLEY
by Mason, Kolehmainen,
Rathburn and Wyss
Attorneys

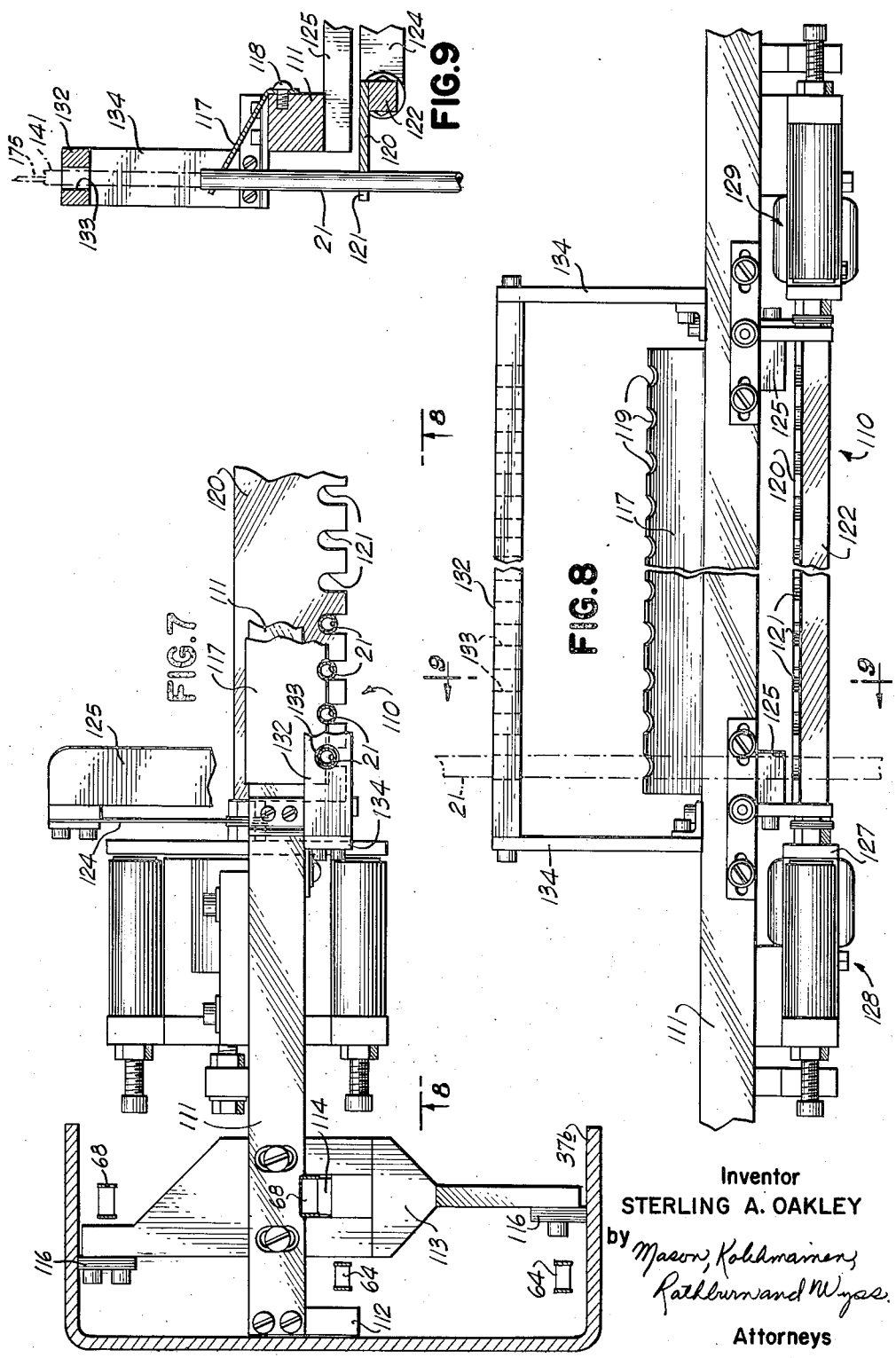

Inventor
STERLING A. OAKLEY
by Mason, Kolehmainen, Rathburn and Wyss,
Attorneys

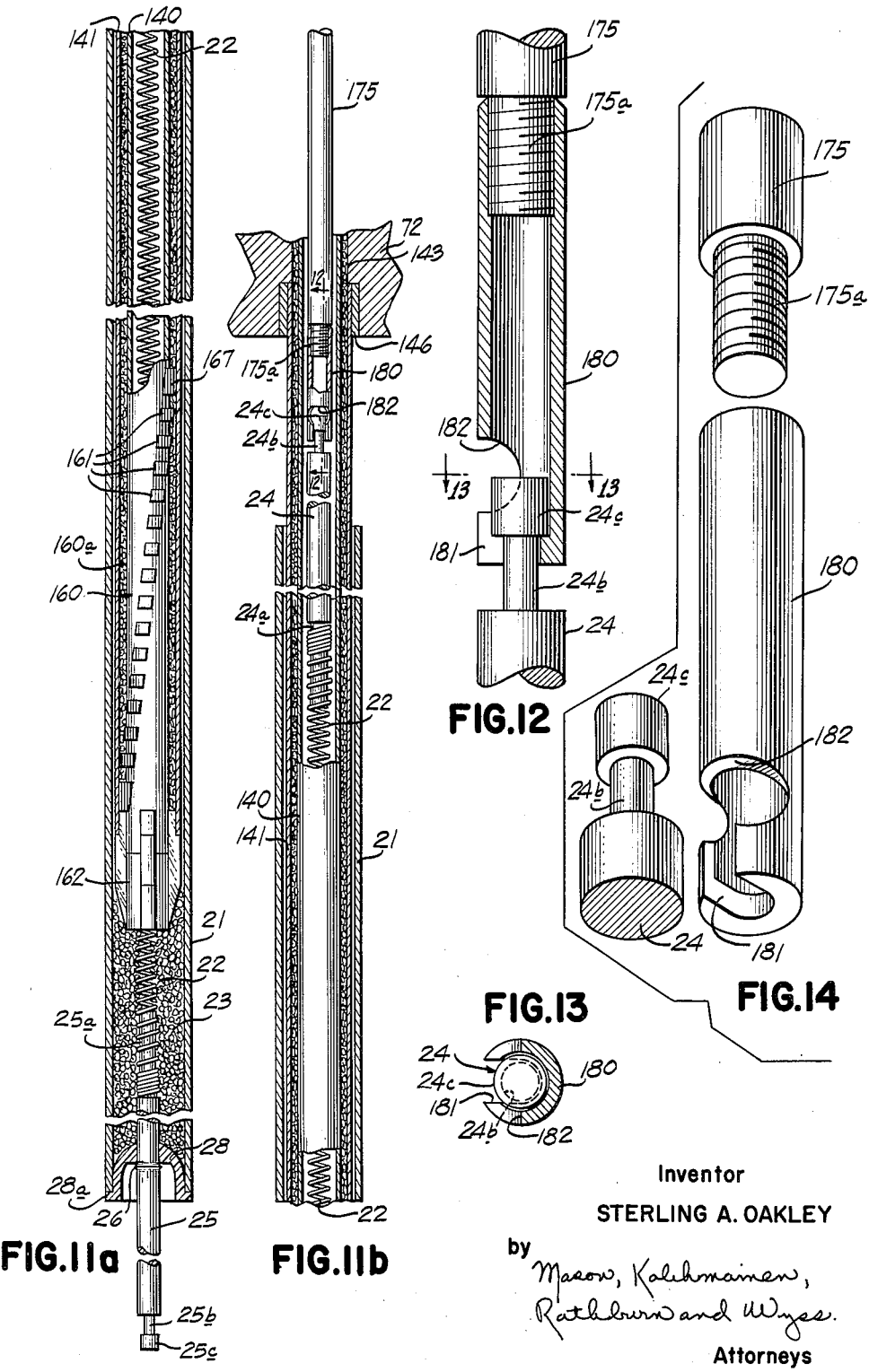

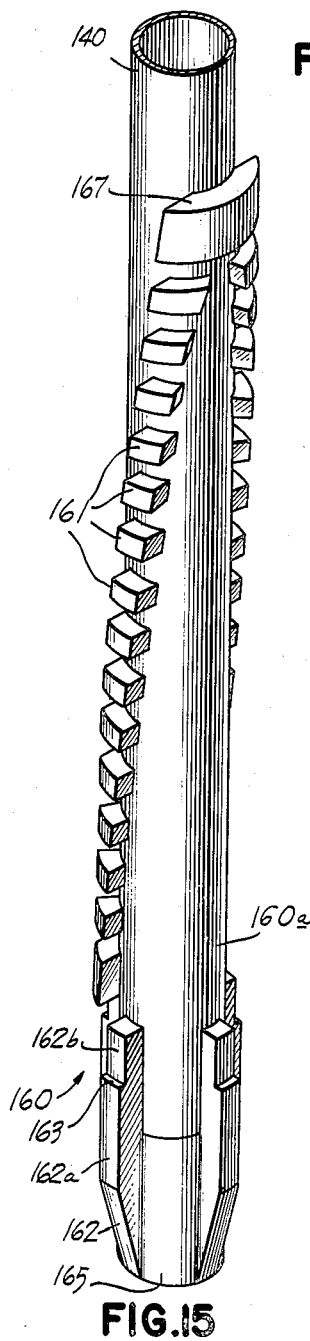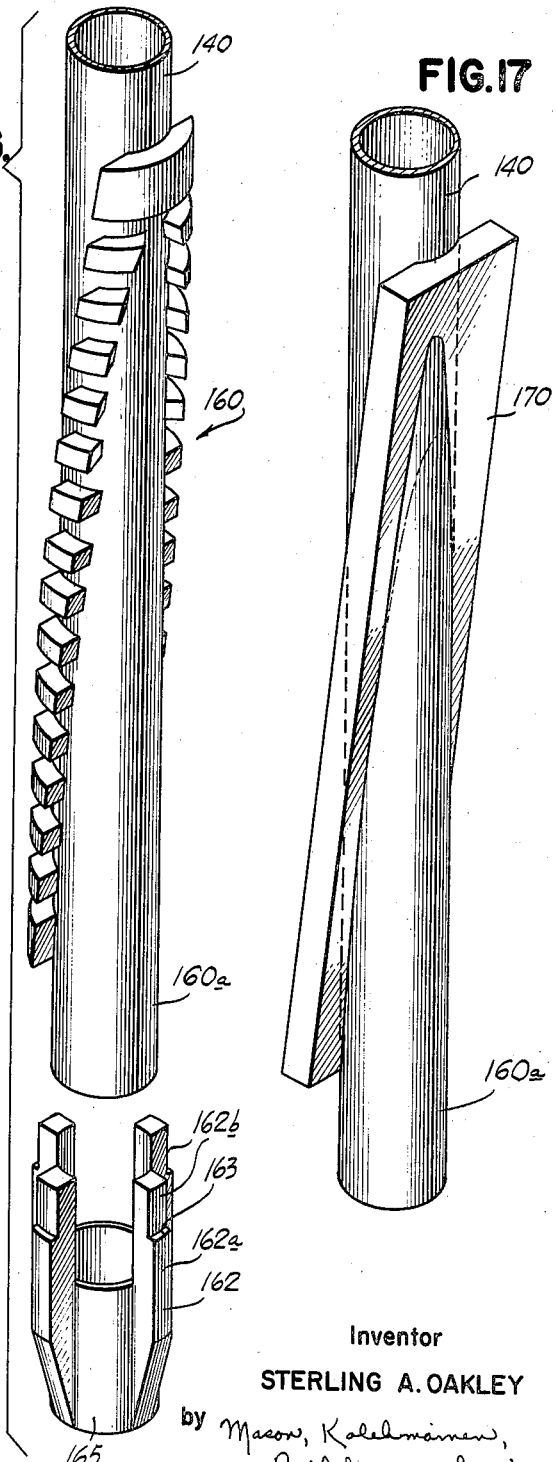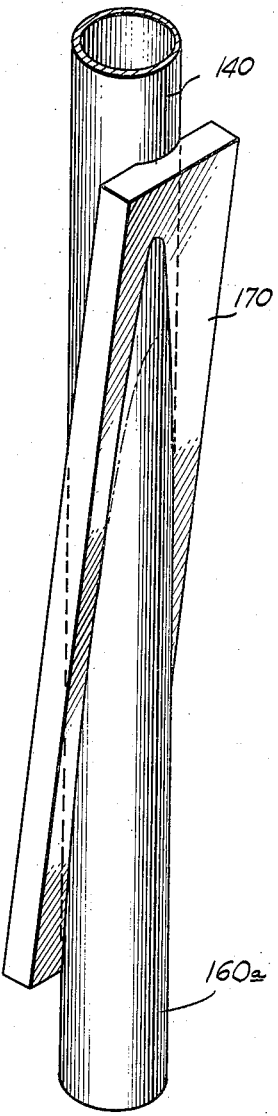

ated Mar. 7, 1961

2,973,572

APPARATUS FOR MANUFACTURING SHEATHED ELECTRICAL HEATING ELEMENTS

Sterling A. Oakley, 6831 N. Kilpatrick Ave., Lincolnwood, Ill.

Filed Apr. 25, 1956, Ser. No. 580,573

15 Claims. (Cl. 29—203)

The present invention relates to a method and apparatus for manufacturing sheathed electrical heating elements, and also to improved sheathed heating elements manufactured by such method and apparatus.

Electrical heating units of the sheathed type have been used extensively for many years. In heating units of this type, a resistance conductor is enclosed by a metallic sheath and is embedded in a compacted mass of granular insulating material such as magnesium oxide which holds the resistance conductor is spaced relation to the sheath and electrically insulates it from the sheath. The insulating material within the sheath may be compacted in any suitable way as by swaging or rolling the sheath. The terminals secured to the ends of the resistance conductor have their adjacently disposed ends embedded in the insulating material and their outer ends projecting from the sheath so that suitable external electrical connection can be made with the heating unit. It will be appreciated that such sheathed electrical heating elements are used in the manufacture of a great many electrical appliances, such as electric ranges, electric irons, electric cooking vessels and the like.

In the manufacture of such heating units, it has been common practice to secure the resistance conductor with the terminals attached thereto centrally of the sheath during the operation of loading the sheath with the insulating material. Moreover, during this loading operation, one end of the sheath is closed, while the other end is left open, so that the insulating material may be loaded through the open end. Thereafter, the loading end is closed.

One arrangement extensively used heretofore in the manufacture of such sheathed electrical heating units comprised inserting into a tubular sheath a resistance conductor with terminals already attached to the ends of such conductor, and so positioned that the ends of the terminals substantially coincided with the ends of the sheath. Both ends of the sheath were usually counterbored to provide inner shoulders for supplying a seat for closure members. One of the terminals was then provided with a solid head having a central opening for the terminal which fitted into the associated end of the sheath, thus holding the terminal centrally of the sheath and also closing that end of the sheath. Preferably, this closure member was seated against the shoulder defined by the counterbore. The insulating material was then loaded through the other end of the sheath which was left open for this purpose, and when the sheath was filled, another closure member in the form of a washerlike member was threaded onto the terminal at this other end to close the sheath. With this arrangement it was necessary to cut off the ends of the sheath in order to expose the desired length of the terminals for making the external connections. Moreover, it was also necessary to core out the ends of the sheath by removing the compacted insulating material to provide cavities in the ends of the sheath surrounding the terminals into which a suitable sealing material such as molten glass or the like could be inserted. This method of manufacturing electrical sheathed heating elements was found to be too expensive.

More recently, the ends of the tubular sheath were rolled or deformed at a point in a short distance from each end to provide a shoulder for supporting a washer or similar material. In this case, the terminals were permitted to extend the desired distance beyond the end of the sheath. As in the preceding arrangement, the sheath was then loaded with the necessary compacted insulating material, which, incidentally, always was a material that was a fairly good heat conductor. The washers then employed for engaging the rolled shoulders or deformations provided in the end of the sheathed heating element were preferably chosen to comprise a material which would be destroyed during the manufacturing process either by being burned away or by being fused away.

It would be desirable to provide a method whereby such heating units could be manufactured in a simple manner without the necessity of deforming the ends of the tube and yet providing a heating unit which when completed is satisfactory in every respect. More particularly, it would be desirable to provide an improved apparatus for filling such sheathed heating element with the granular insulating material in a manner to insure absolute centering of the resistance wire and uniform filling with the insulating material. It will be appreciated that the life of such sheathed heating elements is dependent upon the proper positioning of the resistance wire centrally of the sheath and the proper filling of the remaining space with the granular insulating material. If this is not the case, electrical breakdown is likely to occur.

Accordingly, it is an object of the present invention to provide an improved apparatus for manufacturing electrical sheathed heating elements.

It is another object of the present invention to provide an improved apparatus for filling sheathed heating elements with a granular insulating material.

Still another object of the present invention resides in an improved means of maintaining the resistance wire centered in the tubular sheath during the filling operation thereof.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

Fig. 1 is an enlarged view, partly in section, of a heating unit of the sheathed type in an intermediate stage of manufacture showing an improved method of sealing the lower end during the manufacturing operation;

Fig. 2 is a front elevational view of improved apparatus for filling a sheathed heating element with granular insulating material showing the apparatus in the starting and final position thereof during a sheath filling operation;

Fig. 3 is a view similar to Fig. 2 showing the apparatus in a different stage in the operation of filling the tubular sheaths of the sheathed heating elements;

Fig. 7 is an enlarged sectional view taken on line 7—7 of Fig. 2;

Fig. 8 is a view looking in the direction of the arrows

Figure 4:
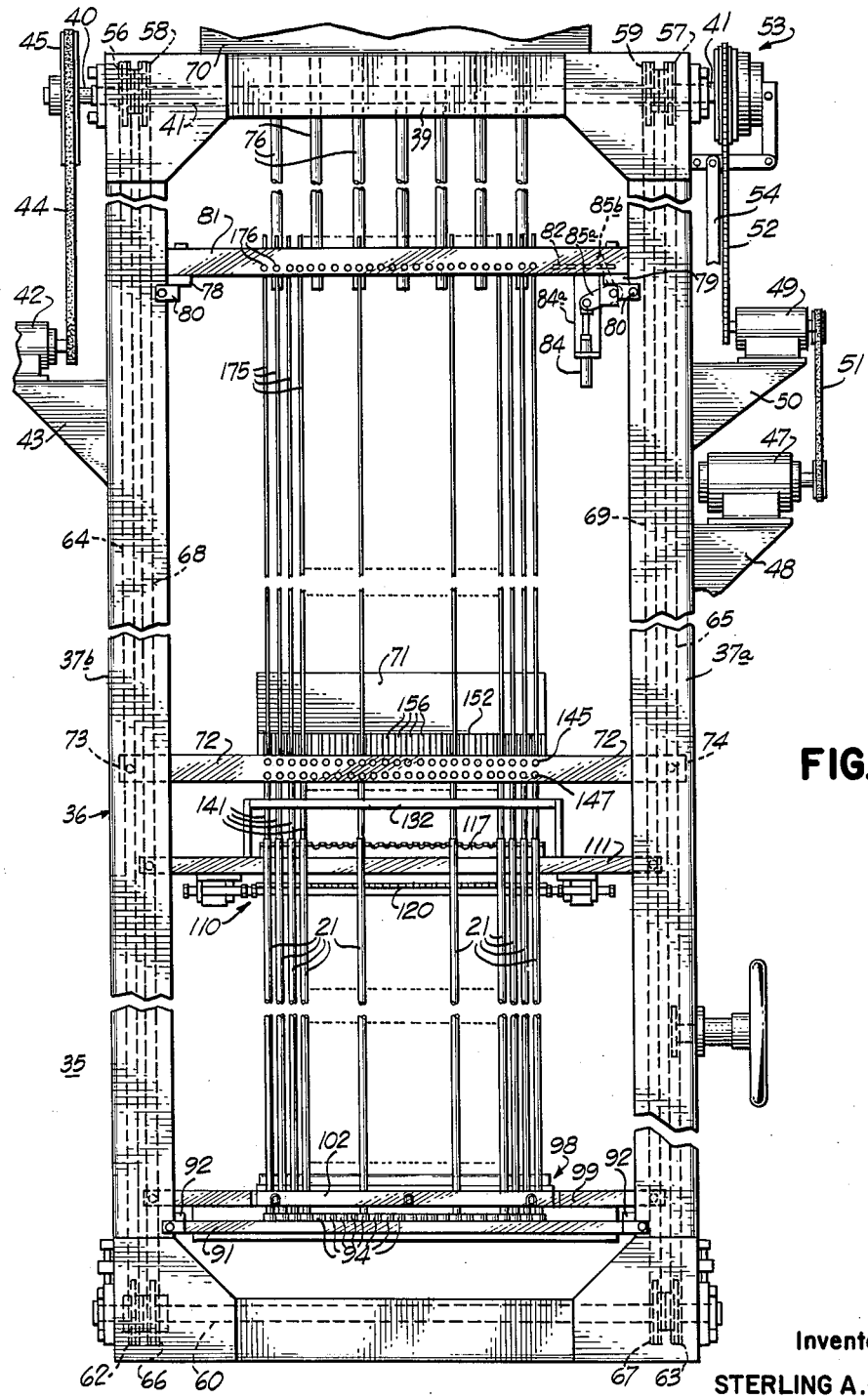
Fig. 4 is another view similar to Figs. 2 and 3 showing another stage in the filling operation of the tubular sheaths of the sheathed heating elements.
Figure 10:
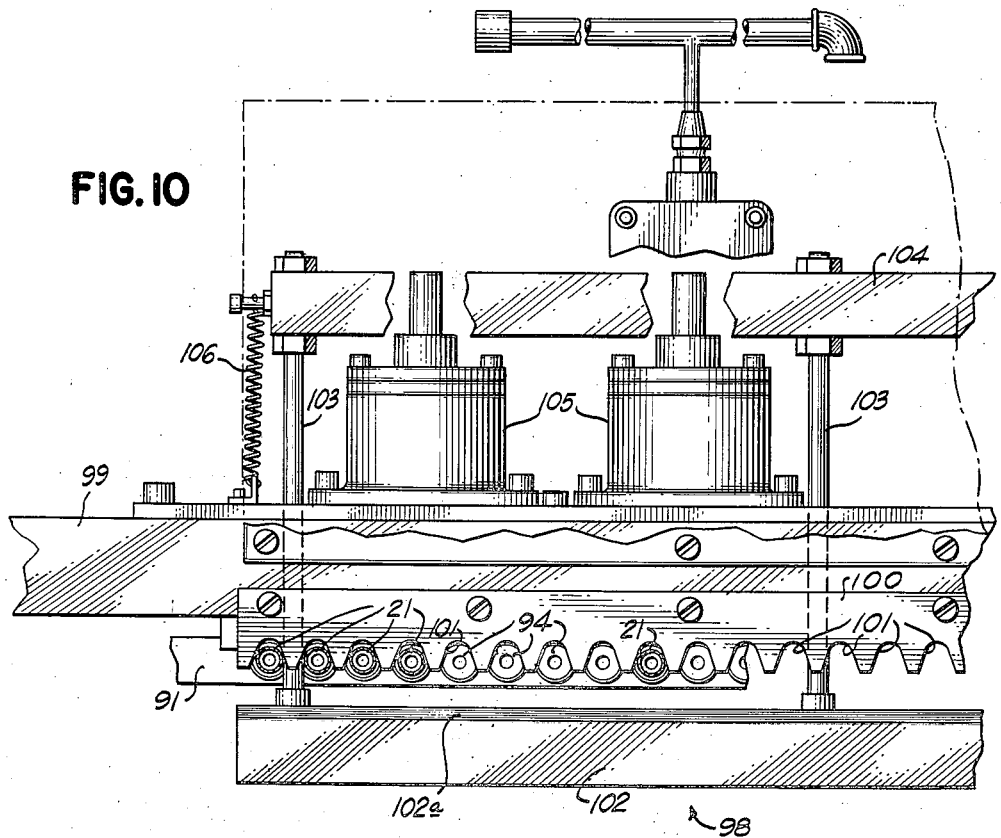
Figure 18:
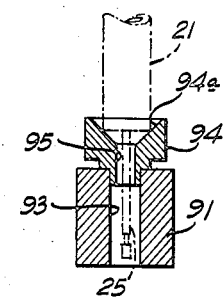

8—8 of Fig. 7, assuming Fig. 7 shows the complete structure;

Fig. 9 is a sectional view taken along line 9—9 of Fig. 8 but showing in dotted lines a portion of the filling mechanism in a position which it assumes in Fig. 3 or Fig. 4 of the drawings;

Fig. 10 is an enlarged sectional view taken on line 10—10 of Fig. 2;

Figs. 11a and 11b together comprise an enlarged sectional view taken through one of the sheathed heating elements shortly after the start of the filling operation and while in the apparatus of Fig. 2 of the drawings, it being understood that the disclosure of Fig. 11b should be connected to the upper end of the disclosure of Fig. 11a;

Fig. 12 is a greatly enlarged sectional view taken on line 12—12 of Fig. 11b;

Fig. 13 is a sectional view taken on line 13—13 of Fig. 12, assuming that Fig. 12 shows a complete structure;

Fig. 14 is an enlarged exploded view of the elements shown in Fig. 12;

Fig. 15 is an enlarged perspective view of the jet portion of the filling mechanism shown in Fig. 11a;

Fig. 16 is a somewhat exploded perspective view of the device of Fig. 15;

Fig. 17 is a perspective view of the elements forming a part of the device of Fig. 15 during a step in the manufacture thereof; and Figure 18 is an enlarged sectional view taken on line 18—18 of Fig. 3.

Briefly, the present invention is concerned, among other things, with the use of a plastic cup for defining the closure of one end of the tubular sheath during the filling operation and at the same time providing a cavity in the end of the sheath after it is filled. This plastic cup is designed to provide a sort of universal support action with respect to the terminal connected thereto. The filling machine with which the present invention is primarily concerned comprises apparatus for supporting a plurality of sheaths to be filled, and also for supporting therein under tension the coiled resistance wires at the centers of the sheaths. A pair of concentric tubes defining between them an annular space for feeding granular filler material and terminating in a centralizer and control valve are provided for insertion within the tubular sheaths to be filled, the resistance wire at the center of the tube being disposed within the inner of these concentric tubes. The combined centralizer and valve member is designed so as to prevent the flow of granular material from the lower end of the annular passageway between the concentric tubes unless the tube to be filled is vibrated. During the filling operation, the tube to be filled is vibrated while the centralizer valve is pulled slowly out of the tube, thus causing filling of the tubular sheath as the centralizer is withdrawn to insure complete filling, and, furthermore, to insure that the resistance wire is centrally disposed of the tube.

Referring now to the drawings, and more particularly to Fig. 1 thereof, there is illustrated an electrical heating unit, generally designated at 20, which essentially comprises the unit immediately following the filling operation thereof, and prior to swaging or rolling. As illustrated, the sheathed heating element 20 comprises a tubular sheath 21 preferably formed of any suitable material which will withstand the temperatures to which the heating element is subjected. Centrally disposed within the sheath 21 is a resistance wire 22, preferably coiled in the form of a helix and formed of any well-known resistance wires, such as one of the nickel chromium alloys extensively used for this purpose. The space within the outer sheath 21 is filled with a granular material designated as 23, which is preferably a good electrical insulator and at the same time a relatively good heat conductor. Such a material has been found to comprise granular magnesium oxide with grain sizes up to twenty-thousandths of an inch. Secured to the ends of the helical resistance wire are a pair of terminals which are illustrated as being identical, but which are designated by reference numerals 24 and 25, respectively. These terminals are preferably secured to the ends of the helical resistance wire in the manner disclosed and claimed in copending Oakley application Serial No. 525,040, filed July 28, 1955, now Patent No. 2,890,320.

The ends of the terminals 24 and 25 to be secured to the resistance wire 22 are preferably of reduced cross section, as designated at 24a and 25a for the respective terminals 24 and 25. In order to facilitate use in the filling machine of the present invention, the other ends of the terminals 24 and 25 are each provided with a short section 24b and 25b, respectively, of reduced cross section between the main body portion of the terminal and an end portion 24c and 25c, respectively, the purpose of which will become apparent from the ensuing description. Preferably, the terminals 24 and 25 are manufactured initially to provide the configuration illustrated. While the terminals such as 24 and 25 are rotated during the welding operation for securing the helical resistance wire thereto, a slight deformation or obstruction such as is indicated at 26 may be provided thereon.

In accordance with the present invention, there is provided a closure cup 28, preferably formed of a suitable plastic such as polystyrene, for closing the bottom end of the associated tubular sheath during a tube filling operation. This cup is provided with a peripheral flange 28a at the open end thereof of sufficient diameter to overlie the end of the associated sheath. The bottom of the cup 28 is provided with a center opening of such size as to receive the terminal 25 therein, but insufficient to permit the deformation or obstruction 26 on the terminal 25 to pass therethrough. Thus, the cup-shaped member 28 forms a closure member for the bottom of the sheath 21 during a tube filling operation, and, additionally, forms an anchor for the lower terminal 25 to hold the same in the position indicated in Fig. 1 of the drawings. Thus cup 28 performs the dual function of, first, maintaining the terminal 25 anchored in position so that tension may be applied to the resistance wire 22 to keep it at the center of the sheath 21, and, secondly, this cup 28 closes the open end of the tube and provides an unfilled space at the end of this tube when eventually removed to accommodate suitable sealing material such as glass seals or the like. With the above-described arrangement it will be apparent that a sort of universal action is permitted between the terminal 25 and the cup-shaped member 26 to assure accurate centering within the sheath 21. The obstruction 26, which is preferably rolled on, effectively comprises a barb which permits such universal action. It will be apparent that the plastic cup 28, after the swaging or rolling operation and during the annealing operation, volatilizes without contamination to provide the desired recess in the end of the sheath 21. It should be understood that the cup 28 might be made of metal, but, in that case, it would be necessary to cut the same away upon the completion of the manufacturing operation unless the metal had a sufficiently low melting temperature so that it could be fused or melted away.

The present invention, in addition to being concerned with the improved method of supporting the lower terminal 25 within the sheath 21 as described above, is also concerned with a machine for manufacturing such sheathed heating units 20 described above. It will be appreciated that the completely manufactured heating units have numerous applications, and, although illustrated as a straight length of heating element, can be deformed to any desired shape, such as a coiled shape when used in an electric range, a hairpin shape when used in an electric flatiron, or the like.

It will be appreciated that sheathed heating elements must be produced economically and at a high speed to be satisfactory for use in the mass-produced electric appliances of today, and in the drawings there is illustrated apparatus for simultaneously manufacturing a substantial number of such sheathed heating elements. Obviously, such sheathed heating elements can have numerous sizes as far as the diameter of the sheath is concerned and numerous lengths, and a machine such as described hereinafter is readily adapted for filling such tubular sheaths of different lengths and diameters. It will be understood that the sheathed heating elements themselves are manufactured in the form of welded tubes, and, incidentally, may be manufactured in accordance with the arrangement disclosed and claimed in copending Oakley application Serial No. 524,935, filed July 28, 1955, now Patent No. 2,788,430.

The filling machine of the present invention, which is designated in Figs. 2, 3 and 4 of the drawings by the reference numeral 35, comprises a frame generally designated as 36, including a pair of channel-shaped vertical supports 37a and 37b disposed in spaced parallel relationship, with the open sides of the channels directed towards each other. The upper and lower ends of these vertical supports 37a and 37b are suitably interconnected by cross beams 38 and 39, the cross beam 38 being the lower one, and the cross beam 39 being the upper one, thus completing the frame 36.

For the purpose of controlling the vertical positioning of certain apparatus during the tube filling operation, there are journalled at the upper end of the frame 36 a pair of shafts, generally designated as 40 and 41, respectively. These shafts are disposed in spaced parallel relationship, one in front of the other, and moreover are disposed in a horizontal plane so that the shaft 41, which is the front shaft as viewed in Fig. 2 of the drawings, hides the shaft 40 except for the portion thereof extending beyond the frame 36. A suitable prime mover indicated in the form of a gear motor 42 is mounted on a platform 43 secured to the channel member 37b. This gear motor 42 is drivingly connected by means of a belt 44 and a pulley 45 to the shaft 40, the pulley 45 being secured to the end of the shaft 40 projecting outside the frame 36. In an embodiment built in accordance with the present invention, the motor 42 comprised a gear motor having a 60:1 speed reduction. Obviously, any other suitable means for rotating the shaft 40 could be employed, the purpose of which will become more apparent from the ensuing description.

Suitable means for actuating the shaft 41 are also provided. As illustrated, an electric motor 47 is supported on a shelf or platform 48 secured to the vertically disposed channel member 37a and drives a speed reducing device 49 similarly supported on a shelf 50, which is also secured to the vertically disposed channel member 37a. The motor 47 is indicated as being drivingly connected by suitable belt or chain means 51 with the speed reducer 49, and the latter is drivingly connected as by means of a chain or other suitable drive mechanism 52 and a clutch 53 with the shaft 41. The clutch 53 may be actuated by means of a suitable lever 54 connected to operate the clutch 53 through suitable link and lever means. It will be apparent that the shafts 40 and 41 can be independently actuated in any desired manner. In a device built in accordance with the present invention, the speed reducing mechanism 49 provided a 900:1 speed reduction.

Supported on the shaft 41 and secured thereto are a pair of sprocket wheels 56 and 57. Similarly secured to the shaft 40 are a pair of sprocket wheels 58 and 59. As illustrated, the sprocket wheels 58 and 59 are disclosed just slightly inside the sprocket wheels 56 and 57, but the two sprocket wheels 56 and 58 are disposed within the confines of the channel 37b at the upper end thereof, while the two sprocket wheels 57 and 59 are disposed within the confines of the channel member 37a at the upper end thereof. At the lower end of the frame 36, a pair of shafts, substantially identical with the shafts 40 and 41, are similarly supported. Since these shafts are also disposed in the same horizontal plane parallel with each other, only the front one of these shafts, designated by the reference numeral 60, is indicated in the drawings. In any event, fixed to the shaft 60 are a pair of sprocket wheels 62 and 63 which are in alignment with the sprocket wheels 56 and 57, respectively. A pair of endless chains, designated as 64 and 65, are suitably mounted on the pairs of sprocket wheels 56 and 62, and 57 and 63, respectively. Thus, upon actuation of the motor 47 and rotation of the shaft 41, vertical movement of the endless chains 64 and 65 within the confines of the channel members 37b and 37a will occur, so that suitable mechanism supported thereon can be moved to any desired vertical position within the confines of the frame 36.

Similarly supported on the shaft (not shown) disposed behind the shaft 60 are a pair of sprocket wheels 66 and 67. The sprocket wheel 66 cooperates with the sprocket wheel 58 to support an endless chain 68, while the sprocket wheel 67 cooperates with the sprocket wheel 59 to support an endless chain 69. Thus, upon operation of the motor 42 and rotation of the shaft 40, the endless chains 68 and 69 can be caused to move in a vertical direction within the confines of the channel-shaped supports 37a and 37b so that any suitable mechanism supported thereon may be moved to any desired position within the confines of the frame 36. Moreover, by employing two independently operable sets of chains, it will be apparent that several devices can be moved to different relative vertical positions independently of each other.

It will be appreciated that in order to fill tubular sheaths which eventually become part of a sheathed heating element with granular insulating material, a source of such material must be available at the filling apparatus 35. To this end there is supported on top of the frame 36 a suitable hopper designated by the reference numeral 70, which preferably may contain a large quantity of granular material such as granular magnesium oxide. In accordance with the present invention, the granular material from the hopper 70 is supplied to a smaller movable feed hopper 71, which feed hopper is supported on a movable manifold 72, which in turn extends across the frame 35 and has the ends thereof secured to the chains 64 and 65 as indicated at 73 and 74. Thus, the manifold 72 and the hopper 71 supported thereon may be moved in a vertical direction within the confines of the frame 36. The upper position of the manifold 72 and associated hopper 71 is shown in Figs. 2 and 3 of the drawings, while a lower position thereof is shown in Fig. 4. The hopper 71 extends across the area within the frame 36 to a sufficient extent to accommodate the maximum number of sheaths to be filled with granular material. Thus, the length of hopper 71 is determined by the number of tubes to be filled therefrom.

Figure 5:
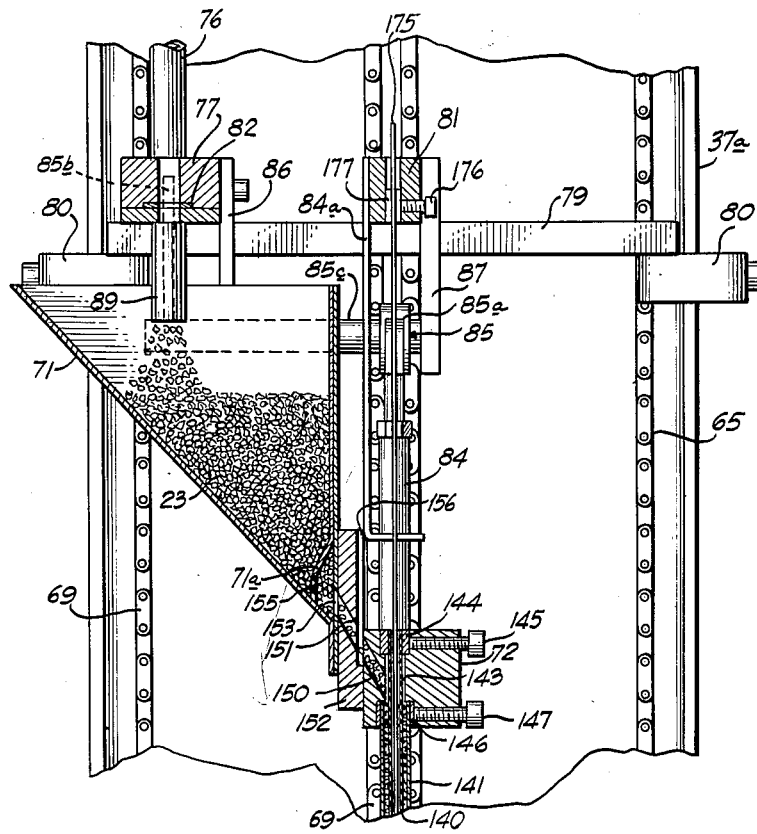
Fig. 5 is an enlarged sectional view taken on line 5—5 of Fig. 2.
Figure 6:
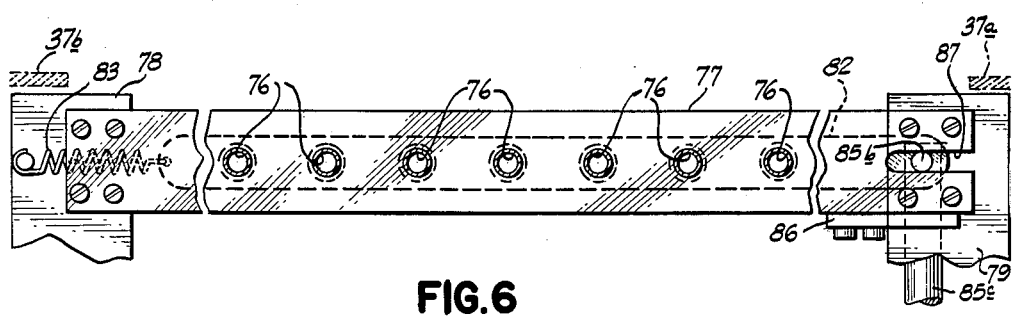
Fig. 6 is an enlarged sectional view taken on line 6—6 of Fig. 2.

To supply the granular material from the main hopper 70 to the movable hopper 71, there are provided a plurality of tubes 76 which extend behind the shafts 40 and 41 and have their upper ends extending through openings defined in the cross frame member 39. The lower ends of the tubes 76, as is best shown in Figs. 5 and 6 of the drawings, extend into spaced openings defined in a horizontally disposed support 77 which essentially comprises a powder slide valve support. The ends of support 77 are preferably secured to suitable cross bars 78 and 79 which extend between the arms of the channel members 37a and 37b. The cross bars in turn are secured to suitable clamps 80 which may be clamped to the flanges of the channel-shaped members 37a and 37b, thus permitting adjustable positioning of the support 77 on frame 36. Also supported on the cross bars 78 and 79 in spaced parallel relationship with the slide valve support 77 is a hook rod support 81 which is in front of the slide valve support 77 and, hence, the latter is not visible in Figs. 2, 3 and 4 of the drawings.

For the purpose of closing off the flow of granular material between the main hopper 70 and the movable hopper 71, there is disposed within the slide valve support 77 a movable slide valve 82 capable of closing off the openings into which the tubes 76 extend. This slide valve 82 is an elongated, thin slidable plate, which can be moved from a position as indicated in Figs. 5 and 6 of the drawings wherein granular material may freely flow between the hoppers 70 and 71 to a position which the slide valve would assume with the apparatus being in the position shown in Fig. 4 of the drawings, where the slide valve 82 is effectively closed. A suitable spring 83 (Fig. 6 of the drawings) preferably biases the slide valve 82 to the closed position. Preferably also, the slide valve 82 is in the open position only when the hopper 71 is in its uppermost position shown in Figs. 2 and 3 of the drawings.

In order automatically to open the slide valve 82 when the hopper 71 is in this uppermost position, there is provided a suitable mechanism comprising a plunger 84 guided for reciprocal movement by a suitable guide means 84a secured to hook rod support 81. The plunger 84 is connected to a bell crank 85 which is pivotally mounted in supports 86 and 87 secured to supports 77 and 81, respectively. Specifically, the arm 85a of bell crank 85 is connected to plunger 84, while arm 85b, which is effectively a pin, extends into an opening in slide valve 82. The support 77 is provided with a slot 88 to accommodate such movement of the pin 85b. The arms 85a and 85b of bell crank 85 are fixed to a shaft 85c which is pivotally mounted in supports 86 and 87. It is obvious that when the manifold 72 approaches its uppermost position, the plunger 84 is engaged thereby and moved upwardly to cause rotation of the bell crank 85 about its pivotal axis, which is the axis of shaft 85c, to open the slide valve 82 against the biasing force of spring 83. Thus, whenever the hopper 71 is moved to its uppermost position indicated in Figs. 2, 3, 5 and 6 of the drawings, the slide valve is open and the movable hopper 71 is filled with granular material designated by the reference numeral 23 in Fig. 5 of the drawings which corresponds to the reference numeral for the same material contained within the sheathed heating element 21 of Fig. 1 of the drawings.

Preferably, a plurality of short tubular members 89 extend from the slide valve support 77 and effectively comprise extension of the tubular member 76 below the slide valve. They, of course, are aligned with openings in support 77 into which the tubes 76 extend. These extensions 89 extend slightly into the hopper 71 so that when the level of the granular material in the hopper 71 reaches the bottom of the extensions 89, the flow will terminate even though the slide valve 82 is in the open position. With the above described arrangement the hook rod support 81 and slide valve support 77 may be positioned at any desired vertical position and suitably clamped to frame 36. The length of the tubes 76 may be varied, dependent upon the positioning of supports 77 and 81.

It will be appreciated that in order to fill the sheaths of a plurality of sheathed heating elements and specifically the sheaths 21 thereof from the hopper 71, means must be provided to support such sheaths within the filling apparatus generally designated as 35. To this end there is provided a stationary anvil plate 91, best shown in Figs. 2, 3, 4 and 18 of the drawings. This stationary anvil plate 91 extends horizontally across the frame 36 near the bottom thereof and has the ends thereof secured to cross members 92 suitably clamped to the vertical channel members 37a and 37b, as indicated in the drawings. This plate is provided with a plurality of spaced openings 93 to support suitable cup members 94, which cup members accommodate the lower ends of the sheaths 21 to be filled by the apparatus 35. Since the apparatus 35 is used to support sheaths 21 of various sizes, it must be capable of supporting cups 94 of different sizes and, hence, these cups are preferably separate from the anvil plate 91. As indicated best in Fig. 18 of the drawings, the sheath 21 to be filled has its lower end disposed in a somewhat conical-shaped recess 94a defined in each cup 94, which recess is concentric with an opening 95 in each cup. Thus, the lower terminal such as 25 of the sheathed heating element 20 can extend into aligned openings 93 and 95 defined in the anvil plate 91 and cups 94, respectively. It will be apparent that the number of cups 94 will depend upon the number of sheaths to be filled simultaneously with the apparatus 35.

For the purposes of firmly holding a plurality of sheaths 21 to be filled during the filling operation, there is provided a holding means or clamping means generally designated at 98 and best shown in Fig. 10 of the drawings. This clamping means 98 permits a plurality of sheaths 21 to be held in a position to be filled, and yet wherein they may readily be released when desired. This clamping means 98 as shown in Figs. 2, 3, 4 and 10 of the drawings comprises a support 99 which is disposed in a horizontal position and extends across the frame 36. Specifically, the ends of the support 99 are secured to cross members, which may be identical with cross members 113 described hereinafter in connection with Fig. 7 of the drawings, and which cross members are secured to the endless chains 68 and 69 for vertical movement relative, for example, to the manifold 72 supported on the chains 64 and 65. The clamping means 98 further includes a positioning plate 100 having a plurality of notches 101 along one edge for receiving the sheaths 21. The clamping plate 100 having the notches 101 is fixedly secured to the support 99 in any suitable manner. To clamp the sheaths 21 disposed in notches 101, there is provided a movable clamping plate 102 adapted to be moved toward and away from the notched edge of positioning plate 100. The movable plate 102 preferably has a clamping surface 102a of leather or rubber which will not harm the sheaths 21. As illustrated, the clamping plate 102 is supported on movable supports 103 connected to a cross head 104, which cross head is actuated by pneumatic means generally designated at 105. The particular construction of the pneumatic means is unimportant as far as the present invention is concerned. A suitable spring 106 biases the movable clamping plate 102 to the position shown in Fig. 10 of the drawings. Upon actuation of the pneumatic clamping means 105, however, the plate 102 is moved into clamping engagement with the sheaths 21. All of the clamping means 98 is mounted on support 99. It will be apparent that with the apparatus in the position designated in Fig. 2 of the drawings the plurality of sheaths 21 will be placed into the cup supports 94, with the lower ends engaging the recesses 94a. Thus, all of the sheaths 21 will be positioned alike as far as the level of the lower end thereof is concerned, and they will be disposed within various ones of the notches 101. When all of them are properly inserted in the machine 35, the clamping mechanism is actuated, whereupon the plurality of sheaths 21 are firmly clamped by the mechanism 98 and by virtue of the chains 68 and 69 may be moved in a vertical direction within the frame 36.

As was mentioned above and as will become more apparent from the ensuing description, a separate valve means is provided to control the flow of granular filler material into each of the sheaths 21. The valve means permits flow only while the sheaths 21 are vibrated, and as soon as such vibration stops the flow of material into the sheaths stops. To this end there is provided a vibrator mechanism generally designated at 110 and best shown in Figs. 7, 8 and 9, although also disclosed in Figs. 2, 3 and 4 of the drawings. The vibrating mechanism 110 includes a horizontally disposed support 111 similar to the support 99, which extends between the vertically disposed channel members 37a and 37b and actually extends into the channel portions thereof, as is best shown in Fig. 7 of the drawings. Secured to each end of the support 111 is a bumper member 112 for engaging the bight portion of the corresponding channel member 37a and 37b. The members 112 may be made of fiber or the like, and they properly guide and position the support 111 as far as the side-to-side movement is concerned with reference to the uprights 37a and 37b. In order to guide the member 111 from the standpoint of front-to-back movement thereof with reference to Figs. 2, 3 and 4 of the drawings, there is secured to each end of the support 111 within the channel members 37a and 37b, respectively, a support member 113 which has an opening 114 therein for receiving one side of the endless chain 68 or 69, as the case may be, and to clamp the same to such chain. The supports 113 extend almost across the area defined by the arm portions of the channels such as 37a and 37b. For guiding each support 113, there are secured to either end thereof fiber members 116 which engage the walls of the adjacent arms of the channel such as 37a and 37b. It will be apparent, therefore, that the support 111 which is secured to the chains 68 and 69 moves simultaneously with the support 99, which latter, as was mentioned above, is similarly connected at each end to support members which may be identical with supports 113. Moreover, the support 99 may also be provided with bumper members 112.

For the purpose of supporting the upper ends of the tubular sheaths 21 to be filled by the filling machine 35 of the present invention, there is provided an upper guide in the form of a notched plate 117 which is fixedly secured to the support 111 as indicated at 118. This plate is disposed at an angle, as is clearly shown in Fig. 9 of the drawings, and includes a plurality of shallow notches 119 along one edge for receiving the upper ends of the sheaths 21.

For the purpose of vibrating sheaths 21, there is provided a notched plate 120 having a plurality of notches along one edge thereof designated as 121 for receiving therein the sheaths 21 to be filled. This plate 120 is secured to a rigid support rod 122, which in turn is mounted on a plurality of leaf springs 124 to permit vibrating movement of plate 120. The leaf springs 124 are connected to suitable arms 125 secured to the support 111. It will be apparent then that the plate 120, by being mounted on deflecting springs 124, can be vibrated in the direction of the longitudinal axis thereof.

To produce such vibration the ends of the rigid rod 120 are each secured to a different one of a pair of armatures 127 which are associated with two independent electromagnets 128 and 129. In an embodiment built in accordance with the present invention, the electromagnets 128 and 129 were energized with alternate half cycles of a thirty cycle alternating current. To this end, this thirty cycle energy is fed through two half-wave rectifiers and the output of one rectifier supplied to electromagnet 128, while the output of the other is supplied to electromagnet 129. Thus, the plate 120 is pulled back and forth with the result that the sheaths 21 are similarly vibrated. The electromagnets 128 and 129 are suitably mounted from the support 111. To cushion the vibratory movement of armatures 127, a plurality of rubber bumpers 130 are provided, mounted within hollow tubes 131. The ends of a pair of bumpers 130 engage the ends of each armature 127. These bumpers also tend to move the plate 120 in the other direction upon deenergization of the associated electromagnet.

Also supported on the support rod 111 is a suitable guide bar 132 for guiding certain filling apparatus to be described hereinafter and insuring its entrance into sheaths 21. This guide rod 132 is provided with a plurality of spaced apertures 133. The guide rod 132 is supported by a pair of vertical support members 134 extending upward from the cross support 111.

For the purpose of supplying granular filler material from the movable hopper 71 to the sheaths 21 to be filled, there are provided a pair of concentric tubes for each sheath to be filled, each pair, as best shown in Figs. 11a and 11b of the drawings, comprising an inner or helix tube 140 and an outer or jet tube 141. The inner tube is referred to as the helix tube since it is adapted closely to surround the resistance wire 22 which is coiled in the form of a helix. It will be appreciated that the concentric tubes 140 and 141 will have a particular diameter for a particular sheath, and various combinations of such tubes will be employed where sheaths of different sizes are to be filled. The outer tube 141 is shown in dotted lines in Fig. 9 to indicate its relationship to the guide 132. As illustrated, the upper end of each inner tube 140 of the plurality of concentric filler tubes extends into one of the plurality of spaced openings 143 provided in the manifold 72 (Fig. 5). A suitable adapter collar 144 is provided for each set of concentric tubes, and these adapter collars are seated in counterbores defined at the top surface of the manifold 72 concentric with the openings 143. Clamping screws 145 hold the adapter collars 144 and the associated inner helix tubes 140 in position. The outer tubes 141 of the concentric filler tubes extend only to the bottom of the manifold 72 and enter openings 143 through adapter rings 146 which are mounted in suitable counterbores defined in the lower surface of the manifold 72. Suitable screws 147 hold the collars 146 and associated outer tubes 141 in place. From the above description it will be noted that access to the annular space between the concentric tubes 140 and 141 can be obtained in manifold 72 by virtue of the termination of outer tube 141 short of the top of inner tube 140.

To supply granular filler material 23 from the hopper 71 to the annular space between tubes 140 and 141, and as best shown in Fig. 5 of the drawings, the manifold 72 has for each opening 143 therein a diagonal filler opening 150 connected to the associated opening 143 at about the middle of manifold 72. These diagonal openings 150 connect with the movable hopper 71 through aligned openings 151 defined in a plate 152 secured to the manifold 72 between the manifold and the hopper 71. Suitable openings such as 153, aligned with the passageways 150 and 151, are provided in the hopper 71. If desired, the hopper 71 may be provided with a baffle 71a having suitable openings 155 therein to insure free flow of the granular material from the hopper 71 into the spaces between the concentric tubes 140 and 141 connected to the manifold 72. If desired, the plate 152 may be provided with a plurality of recesses 156, one for each of the passageways 150, to receive a closure plate not shown. Such closure plate may be inserted in any one of the recesses 156 to terminate the flow of granular material into a particular one of the sheaths 21 being filled. This is sometimes desirable where something happens to one filling tube and it is desired to continue operation of the others.

In accordance with the present invention and as best shown in Figs. 11a, 15 and 16 of the drawings, the lower ends of each set of the concentric tubes 140 and 141 terminate in a centralizer valve generally designated as 160. This centralizer valve comprises an effective extension of the inner tube 140 to which are affixed a plurality of projections 161 arranged in a predetermined manner to serve as a valve for the flow of granular material, which valve permits the flow of material upon vibration but prevents flow upon termination of such vibration. The lowermost end of the centralizer valve 160 is provided with a tip member 162, best shown in Figs. 15 and 16 of the drawings, which tip member includes a plurality of spaced ribs 162a which have an outside dimension only slightly smaller than the interior dimension of the sheath 21. In fact, as illustrated in the drawings, the ribs 162a of the tip 162 have the same dimension as the outside diameter of the outer tube 141.

Also as illustrated, the ribs 162a at the end most remote from the tip thereof are cut away as indicated at 162b to define shoulders 163 against which the outer tube 141 seats. Thus, there is provided a passageway for granular material between the ribs 162 on the outside of the inner tube 140. Actually, the tip 162 is made as a unitary structure before attachment to the inner tube 140 and includes a tubular portion 165 which effectively is also an extension of the tube 140 as well as an extension of the tube employed to define the centralizer valve 160. The projections 161 secured to the tube portion of the centralizer valve 160 which is designated as 160a but which might be considered to be tube 140 are arranged in two diverging rows, as best shown in Figs. 15 and 16, so as to provide a sort of V-shaped configuration with each successive lower projection being slightly displaced laterally from the projection immediately above. With this arrangement, including a single large projection 167 at the junction point of the two arms of the projections arranged in the form of a V, there is effectively provided around the entire tube 160a, which is an extension of tube 140, a plurality of shelves so disposed that granular material flowing down along the outside of the tube 140 will be caught by the ledges or shelves 161 and flow thereof will be stopped. However, upon vibration the granular material will flow between the ledges or projections 161 and between the ribs 162.

To understand how the centralizer valve 160 is constructed, reference may be had to Fig. 17 where the inner tube 160a is illustrated. As there illustrated, a plate member 170 is provided through which is drilled an opening at an angle of between seven and nine degrees to receive the tube 160a. In an embodiment built in accordance with the present invention, this plate 170 was about .045 of an inch thick and 5/16 of an inch wide. The tube 160a was then hard-soldered or brazed to the plate 170, after which the plate was cut away to provide the ledges 161 and 167 as shown in Figs. 15 and 16 of the drawings. The tube 160a was then joined as an extension on tube 140 as by welding or the like. It should be understood that the present invention is not limited to manufacturing the centralizer valve 160 by the process, one step of which is illustrated in Fig. 17 of the drawings, but any suitable arrangement for accomplishing the result shown in Fig. 17 may be employed. Actually, the centralizer valve 160 is sometimes referred to as a caterpillar valve, since the projections are somewhat similar to the projections on a caterpillar.

From the above description it will be apparent that there has been provided apparatus in which the concentric tubes terminating in a centralizer valve and supplied with granular material are supported on a mechanism which is capable of moving in a vertical direction within the frame 36. Similarly, there is provided an arangement for providing a plurality of sheaths to be filled also arranged for vertical movement in the frame 36 independent from the movement of the concentric filler tubes connected to the hopper 71, together with vibrating means for vibrating these sheaths. It is, however, important to support the resistance wires 22 within the sheaths 21 during a filling operation and to provide means whereby these resistance wires may be inserted in a simple manner within the sheaths. To this end the hook rod support 81 described above, which is rigidly secured to the frame 36, is provided with a plurality of spaced openings 174 aligned with the openings 143 in the manifold 72, which latter openings are connected to the concentric tubes 140 and 141. A plurality of hook rods 175 are provided, one for each of the openings 174. To secure the upper end of each hook rod to support 81, suitable clamping means, such as the screws 176, are provided which clamp the associated hook rod in position. Preferably, an interposed collar 177 may be employed to insure clamping of the hook rod concentrically with the opening 174. The lower ends of the hook rods 175 are preferably threaded as indicated at 175a in Figs. 11b, 12 and 14 of the drawings to acommodate a suitable adapter hook 180. This adapted hook 180 is a tubular member having an axially extending slot 181 at one end which terminates in an enlarged opening 182 in the side thereof forming a sort of keyhole slot. The opening 182 permits the enlargement 24c of the terminal 24 to enter, and the portion of reduced cross section 24b will also pass through the slot 181. Thus, the upper terminal 24 connected to the resistance wire 23 can be quickly supported from the adapter hook 180 as clearly indicated in Figs. 11b and 12 of the drawings.

It will be appreciated that parts of the machine are normally in the position shown in Fig. 2 of the drawings, whereupon the sheaths 21 to be filled are supported on the anvil 91 in a manner described above and clamped in position by the clamping mechanism 98, with the other ends disposed in the edge notches 119 in the upper guide plate 117. The sheaths 21 are then moved to the position shown in Fig. 3 of the drawings by manipulating the gear motor 42 driving the shaft 40 which causes the chains 68 and 69 to move the clamping mechanism 98 and the vibrating mechanism 110 associated therewith to the poition shown in Fig. 3 of the drawings. In this position the hook rod adapters 180 project below the lower ends of the sheaths 21, as is best shown in Fig. 3 of the drawings, whereupon the coiled resistor elements with the upper and lower terminals 24 and 25 secured thereto may be suitably supported from the hook rods 175 in the manner indicated in Figs. 3 and 12 of the drawings. As was described in detail in connection with Fig. 1 of the drawings, each of the lower terminals 25 has also associated therewith a plastic cup-shaped member 28 which is indicated in Fig. 3 of the drawings and is also disclosed in Fig. 11a of the drawings. Thereupon, the gear motor 42 is actuated and the clutch 53 released simultaneously to move the sheaths 21 to the lowermost position as shown in Fig. 4 of the drawings and also to move the hopper 71 and the associated manifold to which the jet tubes comprising the concentric tubes 140 and 141 are attached to the lowermost position shown in Fig. 4 of the drawings. In this position the slide valve 82 is moved to the closed position by spring 83. In the position shown in Fig. 4 the centralizer valve 160, and particularly the tip 162 thereof is adjacent the bottom of the sheath 21 just above the cup-shaped member 28. The filling operation is now ready to start and this is accomplished by starting the vibrator mechanism 110 and by slowly moving the pairs of concentric tubes 140 and 141 with the associated centralizer valves 160 out of the sheaths 21 through operation of the motor 47. In an embodiment built in accordance with the present invention, the motor 47 is operated so that the upward movement of the hopper 71 and associated pairs of concentric tubes 140 and 141 are moved at about six inches per minute. The vibration produced by the vibrator unit 110 causes the granular material to flow around the tips 162 between the ribs 162a. The granular material may have grain sizes up to .020 of an inch and the actual clearance between the concentric tubes is of the order of .028 of an inch for certain tubes to be filled. With this arrangement the inner tube 140 maintains the helical resistance element 22 in the center of the sheath 21 at all times while the granular material is surrounding the same and the filling occurs in a very even manner without any so-called "boiling up" of material. Moreover, the flow ocurs upon operation of the vibrator and as soon as the vibrator is shut off the flow stops by virtue of the improved centralizer valve 160 of the present invention. As was pointed out above, if, during the filling operation, misoperation of one particular filling unit for filling a particular sheath fails to operate, a suitable plate may be inserted in the recess 156 defined in plate 152 for controlling the passage of granular material through the aligned diagonally positioned passageways 150 and 151.

While there have been illustrated and described preferred embodiments of the present invention, it will be understood that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. Apparatus for manufacturing sheathed electrical heaters of the type including an electrical conductive heating element disposed within a protective sheath, said apparatus comprising, a first rack for supporting a plurality of said sheaths, a second rack for supporting a plurality of tensioning rods, said rods being adapted to extend respectively through said sheaths when they are supported on the rack provided therefor, means on the ends of said rods for attachment to respective terminal members of said heating elements, means for moving said racks with respect to one another so as to withdraw said rods from said sheaths thereby threading said heating elements through respective ones of said sheaths, means adapted to cooperate with annular stop means provided on other terminal members of each of said heaters to prevent the withdrawal of said heaters from said sheaths by said movement of said rods, a third rack proximately disposed with respect to said first and second racks, a plurality of concentric filling tubes mounted on said third rack, valve means disposed between said tubes, said valve means including a plurality of spaced apart protrusions on one of said tubes, means for inserting said concentric tubes into said sheaths and for withdrawing said tubes from said sheaths, means for feeding an insulating comminuted material through the space between said concentric tubes as said tubes are being withdrawn from said sheaths whereby the space between said heaters and the surrounding sheaths is filled with said comminuted material, the inner one of said concentric tubes having an internal diameter only slightly greater than the external diameter of said heaters whereby as said sheaths are filled with said comminuted material during the withdrawal of said tubes the feeders are accurately centered within said sheath, and means for vibrating said tubes during the withdrawal of said concentric tubes.

2. In apparatus for manufacturing sheathed heating elements, means for supporting a plurality of sheaths to be filled with a comminuted material, means for positioning a plurality of resistance elements within said sheaths, means for positioning a plurality of sets of concentric filling tubes respectively within said sheaths and enclosing said resistance elements, and means for feeding the filler material through said tubes as they are withdrawn from said sheaths so as to centrally position said resistance elements within said sheaths and to fill said sheaths from the bottom, thereby avoiding any air spaces.

3. The apparatus claimed in claim 2 wherein the internal diameter of the inner one of said tubes only slightly exceeds the external diameter of a heating element disposed within said sheath whereby said heating element is centered with respect to the sheath during the filling operation.

4. In apparatus for filling a unit with a granular filler, said unit comprising a sheath having a centrally positioned heater element; first and second filling tubes, said tubes being disposed concentrically with respect to one another to define an annular space therebetween, the inner one of said tubes having an internal diameter only slightly greater than the external diameter of said heater element, and valve means integral with at least one of said tubes and disposed in the space between said concentric tubes for controlling the feeding of the filler material through said annular space.

5. The apparatus claimed in claim 4 wherein said valve means includes a plurality of spaced protrusions on one of said tubes.

6. The apparatus set forth in claim 5 above and additionally including means for controllably vibrating said tubes for permitting the passage of comminuted material through the space between said tubes.

7. The apparatus as set forth in claim 5 above wherein the protrusions are provided on the external surface of said inner tube.

8. The apparatus as set forth in claim 7 above wherein the protrusions are disposed along a helix.

9. Apparatus for manufacturing sheathed electrical heating elements of the type including an electrical conductive heating element disposed within a tubular protective sheath, said apparatus comprising, a first rack for supporting a plurality of said sheaths, a second rack disposed below said first rack for supporting a plurality of tensioning rods, said rods being adapted to extend respectively through said sheaths when they are supported on said second rack, means on the ends of said rods for attaching terminal members of said heating elements thereto, means for moving said first and second racks with respect to one another so as to insert and withdraw said rods into and out of said sheaths so as to thread said heaters through respective ones of said sheaths, means adapted to cooperate with stop means provided on the lower terminal members of each of said heaters to prevent the withdrawal of said heaters from said sheaths when said rods are withdrawn from said sheaths, a third rack disposed above said first and second racks, a plurality of filling tubes mounted on said third rack, valve means for controlling the flow of a comminuted material through said tubes, and means for driving said third rack to insert said tubes into said sheaths and to withdraw said tubes from said sheaths.

10. In apparatus for manufacturing sheathed heating elements, means for supporting a plurality of sheaths to be filled with a comminuted material, means for positioning a plurality of resistance elements within said sheath, means for positioning a plurality of sets of first and second concentric filling tubes within said sheaths and enclosing said resistance elements, the inner one of said tubes having an internal diameter only slightly greater than the external diameter of said resistance elements, means for feeding the filler material through said tubes as they are withdrawn from said sheath so as to concentrically position each said resistance element within its associated sheath and to fill said sheath from the bottom thereby avoiding any air spaces, and valve means for controlling the feeding of the filler material therethrough.

11. The apparatus set forth in claim 10 above wherein said valve means includes a plurality of spaced protrusions on one of said tubes and disposed in the space between said tubes.

12. The apparatus as defined in claim 11 above and additionally including means for controllably vibrating said tubes for permitting the passage of comminuted material through the space between the tubes.

13. The apparatus as set forth in claim 11 above wherein the protrusions are provided on the external surface of said inner tube.

14. The apparatus as set forth in claim 13 above wherein the protrusions are disposed along a helix.

15. Apparatus for manufacturing sheathed electrical heating elements comprising, mechanism for positioning a heating element within an outer protective sheath, mechanism for maintaining said heating element under tension within said sheath, mechanism for filling the space between said heating element and said sheath with a comminuted material, and mechanism for vibrating said sheath while said comminuted material is being placed therein.

References Cited in the file of this patent

UNITED STATES PATENTS

| | | |
|---|---|---|
| 227,854 | Steuerwald | May 18, 1880 |
| 1,842,462 | Smith | Jan. 26, 1932 |
| 2,202,575 | Deroche | May 28, 1940 |
| 2,437,205 | Middleton | Mar. 2, 1948 |
| 2,561,457 | Beales | July 24, 1951 |
| 2,656,594 | Westling | Oct. 27, 1953 |
| 2,659,795 | Boggs | Nov. 17, 1953 |
| 2,670,529 | Thomas | Mar. 2, 1954 |
| 2,677,172 | Oakley | May 4, 1954 |
| 2,683,973 | Mettler | July 20, 1954 |
| 2,703,355 | Hagglund | Mar. 1, 1955 |
| 2,704,395 | Heidegger | Mar. 22, 1955 |
| 2,706,331 | Bartelheim et al. | Apr. 19, 1955 |
| 2,714,761 | Wampole | Aug. 9, 1955 |
| 2,768,431 | Hughes | Oct. 30, 1956 |